US006811183B1

United States Patent
Serban et al.

(10) Patent No.: US 6,811,183 B1
(45) Date of Patent: Nov. 2, 2004

(54) CONTROLLED DEFLATION DEVICE FOR A GAS BAG

(75) Inventors: Bogdan Serban, Luxembourg (LU); Michel Witte, Luxembourg (LU); Volker Petri, Aidlingen (DE); Michael Meyer, Alfdorf (DE); Harald Rudolf, Tübingen (DE)

(73) Assignees: I.E.E. International Electronics & Engineering S.ar.l., Luxembourg (LU); DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/088,716
(22) PCT Filed: Sep. 12, 2000
(86) PCT No.: PCT/EP00/08905
§ 371 (c)(1), (2), (4) Date: May 30, 2002
(87) PCT Pub. No.: WO01/21451
PCT Pub. Date: Mar. 29, 2001

(30) Foreign Application Priority Data

Sep. 20, 1999 (LU) .................................................. 90441

(51) Int. Cl.⁷ ........................... B60R 21/16; B60R 21/28
(52) U.S. Cl. ........................................ 280/739; 280/735
(58) Field of Search ................................. 280/739, 335; B60R 21/28

(56) References Cited

U.S. PATENT DOCUMENTS

| 5,518,269 | A | * | 5/1996 | Storey et al. ................ 280/739 |
| 5,899,494 | A | | 5/1999 | Lane, Jr. |
| 6,131,949 | A | | 10/2000 | Lewis et al. |
| 6,183,003 | B1 | * | 2/2001 | Matsuhashi et al. ...... 280/728.2 |
| 6,378,898 | B1 | * | 4/2002 | Lewis et al. ................. 280/733 |
| 6,517,108 | B1 | * | 2/2003 | Vinton et al. ............... 280/739 |

FOREIGN PATENT DOCUMENTS

| DE | 197 33 599 A1 | 2/1999 |
| EP | 0 638 466 A1 | 2/1995 |
| GB | 2 306 409 A | 5/1997 |
| JP | 54061727 | 5/1979 |

\* cited by examiner

Primary Examiner—Ruth Ilan
(74) Attorney, Agent, or Firm—McCormick, Paulding & Huber LLP

(57) ABSTRACT

A device for venting a gas bag made of a textile material includes at least one ignitable pyrotechnic charge which is associated with the gas bag in such a way that, when the pyrotechnic charge is ignited, at least one thread of the textile material is directly destroyed by the explosion of the pyrotechnic charge.

21 Claims, 4 Drawing Sheets

CONTROLLED DEFLATION DEVICE FOR A GAS BAG

FIELD OF THE INVENTION

The present invention relates to a device for venting an airbag, especially for venting an airbag in an active passenger restraint system of a vehicle.

BACKGROUND OF THE INVENTION

In order to reduce the risks of injury for the vehicle passengers in case of a road accident, modem vehicles are increasingly often equipped with an active passenger restraint system. Such an active passenger restraint system comprises in general one or more airbags which are in a flash inflated in case of an impact of the vehicle and which take up the energy released by the passenger during the impact.

As an airbag, such as a frontal airbag, exits the dashboard or the steering wheel mounted module at very high speeds (200 to 300 km/h), for avoiding injuries of the passenger by the released airbag it is advantageous to interrupt or control the complete inflating or unfolding of the airbag as soon as the passenger has sufficiently immerged in the airbag and a sufficient pressure has built up in the airbag in order to be able to securely take up the energy of the passenger. As the time when the passenger has sufficiently immerged in the airbag very strongly depends on several parameters, such as the seat position of the passenger at the time of the accident, the interruption of the inflating process of the airbag can become necessary in any stadium of its release operation.

As an inflating device functioning on the basis of pyrotechnics, a so-called inflator, cannot be interrupted in its function at any arbitrary time due to the system, a passenger restraint system consequently has to comprise a device for purposefully venting the airbag for interrupting the release operation in a controlled manner. Such a device has to permit to deflate the gas blown into the airbag by the inflator at any arbitrary time and to avoid a further inflation of the airbag.

From WO-A-98/01323, a device is known in which the gas bag comprises a ventilation opening which Is closed at a frangible line or predetermined breaking line. The predetermined breaking line is designed to remain intact below a predetermined nominal pressure within the airbag and to automatically break open above the nominal pressure under the influence of the pressure. Such a predetermined breaking line is generally achieved by a thoroughly and technically precisely dimensioned weakening of the material employed. This weakening of the material can e.g. be effected by a perforation in which small incisions are disposed along the provided predetermined breaking line. In another embodiment, the predetermined breaking line is formed when closing the airbag by means of a seam produced by sewing, the thread used for sewing and the distance between the stitches being exactly mated to the demands of the airbag release. Alternatively, the airbag hull can also be closed by sealing, e.g. by ultrasonic sealing, with exactly adapted sealing patterns. In this case, the sealing seam is the predetermined breaking line.

From the EP-A-638 466, an airbag is known in which certain areas of the airbag material are slightly permeable to gas at a normal working pressure due to a purposeful weakening of the airbag material. These areas, the so-called dynamic vents, are for example formed by perforating the airbag material by means of a laser or by means of a needle punch. At a critical gas pressure above the normal working pressure, the gas escaping from the dynamic vents causes a melting or burning of the airbag material.

The problem with such predetermined breaking lines or dynamic vents, respectively, which automatically break open under the airbag pressure, is that due to the manufacturing tolerances an exact adjustment of the required nominal pressure at which the predetermined breaking line or the dynamic vent, respectively, breaks open is hardly possible.

A solution of this problem is to be found in controlled venting devices.

The document U.S. Pat. No. 5,899,494, for example, describes an airbag device in which the inflating device is connected with the airbag by means of a distributor. The inflating device and the distributor are arranged in a housing which is gas-tightly sealed at one side of the airbag. The distributor as well as the housing are provided with a deflagration device which can burn a vent into the distributor or the housing, respectively, within a very short time after activation by an electrical pulse.

A controlled venting device is also described in the document GB-A-2 306 409. In this device, the airbag comprises a valve which is opened upon control by an electric signal. In a first embodiment, the valve comprises an expanded opening in the airbag material which is sealed by a sealing disc made of a meltable material. The disc comprises a predetermined breaking point with a reduced thickness to which a pyrotechnic charge is assigned at a distance. If the pyrotechnic charge is ignited by an electric signal, the same generates a flame which burns through the disc material in the region of the predetermined breaking point. Subsequently, the sealing disc further cracks open along the predetermined breaking point such that a fairly large vent is formed.

In another embodiment of the device from the GB-A-2 306 409, the airbag has a two-layer design. In the region of the valve, one of the layers comprises an opening which is sealed by a membrane formed by the second layer. A housing mounted at the airbag contains an ignitable pyrotechnic charge and a piston disposed between the pyrotechnic charge and the membrane and being provided with a cutting blade. By igniting the pyrotechnic charge, the piston is driven into the direction of the membrane, the cutting blade cutting the membrane, such that a vent is cut into the airbag.

SUMMARY OF THE INVENTION

Consequently, it is the object of the present invention to propose another device for purposefully venting a gas bag.

This object is solved according to the invention by a device for venting a gas bag made of a textile material, especially an airbag, with at least one ignitable pyrotechnic charge which is associated to the gas bag in a region such that, when the pyrotechnic charge is ignited, at least one thread of the textile material is destroyed in the region of the pyrotechnic charge. The pyrotechnic charge is in this case arranged directly at or in the textile material, so that, when the pyrotechnic charge is ignited, at least one thread of the textile material is directly destroyed by the explosion of the pyrotechnic charge. By the destruction of at least one thread of the textile material, commonly a woven or knitted fabric, the textile material can crack open at the respective site. Under the influence of the gas pressure in the interior of the gas bag, the textile material cracks further open at the respective site, so that a fairly large vent opening is formed through which the gas flowing into the gas bag can escape. Thereby, a further inflation of the airbag is effectively suppressed. It should be noted that the thread to be destroyed by the explosion is a "normal" thread of the textile material, e.g. a weaving or a knitting thread of the airbag, as well as a seam thread of a fastening seam formed by an appropriate production technique in the material of the gas bag, which thread is provided especially for this purpose. As soon as the seam fiber is broken at at least one site, the fastening seam can be opened without any expenditure of force if it is appropriately designed by special weaving or knitting techniques, respectively, and so the vent opening can be uncovered. It should further be noted that in case of a corresponding expansion of the pyrotechnic charge several threads of the textile material can be destroyed simultaneously, so that the vent opening quickly reaches the desired size.

In contrast to the presently known devices, the device according to the invention is actively triggered by igniting the pyrotechnic charge. This means that the venting operation can be triggered at any time in an exactly controlled manner. The triggering of the venting device can, for example, be effected by an airbag control module, after a sensor means has detected that a sufficient force or pressure level between the airbag and the passenger has been exceeded. The ignition of the pyrotechnic charge is preferably effected electrically, i.e. by an ignition pulse or an ignition current which is applied to the pyrotechnic charge by the control device, e.g. the airbag control, via connection lines and which heats the same to a temperature above the ignition temperature of the pyrotechnic charge.

Another advantage of the device according to the invention is that in the airbag material no predetermined breaking point, i.e. no purposeful weakening, has to be provided. The mechanical strength of the airbag material is accordingly not impaired before the present device is triggered. This is of a special importance as the folded airbag has to be securely sealed in order to guarantee an inflation in case of an impact. In particular when manufacturing the airbag and mounting it into the vehicle, the airbag has to withstand the deformations and loads involved without being damaged, as a damage could reduce its proper function over the required working life.

In a first possible aspect of the invention, the pyrotechnic charge is formed as an explosive thread which is introduced into the textile material of the gas bag or applied onto the textile material. Such an explosive thread comprises, for example, an electrically conductive stranded wire which is surrounded by an explosive casing and/or into the interweaving of which an explosive is introduced. Alternatively, the explosive thread can comprise a thread made of electrically conductive explosive material.

The explosive thread can, for example, be directly interlaced or worked into the textile material when manufacturing the airbag material.

In this manner, the explosive thread is an integral part of the textile material. Another possibility of introducing the thread is to sew the explosive thread into the textile material after the manufacture of the same. The explosive thread can, for example, serve as a seam thread with which a defined vent opening is sewn up. In contrast to introducing the thread into the textile material of the gas bag, the explosive thread can also be applied onto the textile material e.g. by sewing it onto the textile material.

In an alternative aspect, the pyrotechnic charge comprises a filament and an explosive coating, the filament being introduced into the gas bag or applied onto the gas bag and the explosive coating being applied onto the gas bag in the region of the filament. The filament can be introduced into or applied onto the textile material according to one of the above described techniques or it is printed onto the textile material, e.g. by means of a known screening process. Subsequently, the explosive is applied onto the textile material over the filament in an arbitrary additive process. If the filament is provided with an ignition current by a control module via connection lines, the filament, together with the explosive provided thereabove, is heated to a temperature above the ignition temperature, so that the pyrotechnic charge is ignited and the airbag is vented.

If the explosive to be applied onto the textile material is electrically conductive, a filament can optionally be dispensed with. In this case, the pyrotechnic charge comprises an explosive coating made of an electrically conductive explosive which is applied between two connection lines for the pyrotechnic charge onto the gas bag such that the explosive coating electrically contacts the two connection lines. When this pyrotechnic charge is provided with the ignition current, the necessary heat for heating the explosive is generated in the explosive coating itself.

It should be noted that all the above mentioned embodiments of the pyrotechnic charge comprise a continuous electrically conductive path which is connected to the control module. Thereby, independent of the respective embodiment of the pyrotechnic charge, it becomes possible to check the same for its operativeness during the normal operation of the vehicle, that is when the airbag is not released. In fact, the control module can check the integrity of the conductors by periodically measuring the electric resistance of the continuous electrically conductive path. If the measured resistance value comprises a greater deviation from a given reference value, e.g. a danger signal can show the driver of the vehicle that the airbag device has to be checked for defects in a workshop.

In a preferred aspect of the invention, the pyrotechnic charge is associated to the gas bag at an inner side of the gas bag. In this case, the connection lines for the pyrotechnic charge will extend internally of the airbag and a damage of the device from the outside is excluded. In this case, the pyrotechnic charge is advantageously arranged in a region of the gas bag facing away from the passenger, such that the gas escaping from the formed vent opening does not blow against the passenger. In this manner, an injury of the passenger by the particles blown out together with the gas flow can be avoided.

It should be noted that the device for venting the airbag is preferably designed such that the total area of the ventilation openings in the airbag conditioned by the triggering of the device is larger than the total area of outlet openings of the airbag which permit an escape of the gas after the complete defolding of the airbag. Here, it is reminded that the outlet openings provided in an airbag only serve for slowly letting escape the gas pressure in the airbag after it has been completely inflated in order to permit a collapsing of the airbag. Accordingly, the total area of these outlet openings is not sufficient for evacuating the gas amount flowing into the airbag when the gas generators are still working. By designing the ventilation openings corresponding to their function to be larger than the outlet openings, it can be guaranteed that the gas flowing into the airbag can escape after the triggering of the venting device so quickly that a further inflation of the airbag can be avoided even if the gas generators are still working.

In order to achieve a redundance in the system, preferably several ignitable pyrotechnic charges are arranged in parallel connection with common connection lines. The pyrotechnic charges can, for example, be arranged in parallel in the direction of the weaving thread. Thereby, it is avoided that the failure or the non-ignition of a charge leads to a failure of the whole system. Moreover, in this embodiment a quicker opening of the vent opening can be achieved as in case of an ignition of the thus arranged pyrotechnic charges the textile material is destroyed at several sites simultaneously.

It should be noted that it can also be advantageous to provide several independent ventilation means at various sites of the airbags. Apart from the redundance conditioned thereby, with such an embodiment a directional venting is also possible by venting the airbag, for example, only in a region facing away from the passenger.

The connection lines for the ignitable pyrotechnic charges are, for example, introduced into the gas bag and/or applied onto the gas bag with one of the above described techniques. A possible production manner is the printing of the lines onto the textile material. This can, for example, be effected in a screening process or any other appropriate printing process.

In order to design a defined ventilation opening, the region of the gas bag where the pyrotechnic charge is associated to the gas bag is preferably circumscribed by at least one seam. The cracking open of the textile material initiated under the influence of the gas pressure in the interior of the gas bag after the ignition of the pyrotechnic charge is stopped at the surrounding seam, so that the formed vent opening has a defined dimension. Thereby, it can be avoided that the opening which is formed widens in an uncontrolled manner and the airbag undergoes a too abrupt pressure drop as a consequence.

It should be noted that the above.described device for venting a gas bag is especially suitable for being employed in a so-called "intelligent" passenger restraint system for a vehicle. Such a passenger restraint system comprises, apart from the venting device, at least one airbag with a control device and a sensor means for detecting a local pressure exerted on the passenger by the airbag. Here, the control device activates the device for venting the gas bag based on a pressure signal detected by the sensor means when a predetermined threshold value is exceeded and triggers the same. For doing so, the control device evaluates the position signal of the sensor means for example according to the pressure and/or time, i.e. according to the local pressure which the airbag exerts on the passenger or the time during which this pressure acts on the passenger.

In a particularly advantageous embodiment, the passenger restraint system comprises several devices for venting a gas bag which are assigned to the airbag in several regions, and the sensor means additionally detects the position of an impact region onto the airbag at which the airbag exerts a local pressure on the passenger. The control device activates in this case by means of a position signal detected by the sensor means preferably the one of the devices for venting the gas bag which is essentially opposite the impact region with respect to the airbag. Such a design for example permits a directional venting by venting the airbag only in a region facing away from the passenger.

In an advantageous embodiment, the sensor means comprises at least one sensor which is arranged on the airbag in a region which faces the passenger when the airbag is released. The sensor can for example be a force sensor arranged on the airbag which takes up the pressure exerted on the passenger by the airbag and converts it into a corresponding electrical signal. Such a force sensor advantageously comprises at least two electrode structures which are applied onto a textile substrate at a certain mutual distance and a layer of a semiconductor material which is applied over the electrode structures in an active region of the sensor in direct contact with the electrode structures, the layer of a semiconductor material comprising an inner resistance being variable in response to a deformation of the layer. The textile substrate can comprise an arbitrary soft textile material. In a particularly advantageous, because simple, variant, the textile material comprises the actual airbag material, the electrode structures being directly applied to the airbag.

Such a sensor can dispense with stiff substrates as they are for example usual in common sheet pressure sensors. Thereby, the sensor has a very high ductility, so that the sensor can be easily folded together with the airbag. Moreover, the risk of an injury for the passenger by the sensor is largely excluded due to the softness of the sensor.

It should be noted that instead of the force sensor, a capacitive distance sensor with at least one electrode structure arranged on the airbag or an inductive distance sensor with at least one inductive coil arranged on the airbag and connected to an alternating voltage can be used.

BRIEF DESCRIPTION OF THE DRAWINGS

In the following, various aspects of the invention are now described with reference to the enclosed Figures. In the drawings.

DETAILED DESCRIPTION OF THE PREFERRED EMBODIMENT

Figure 1:
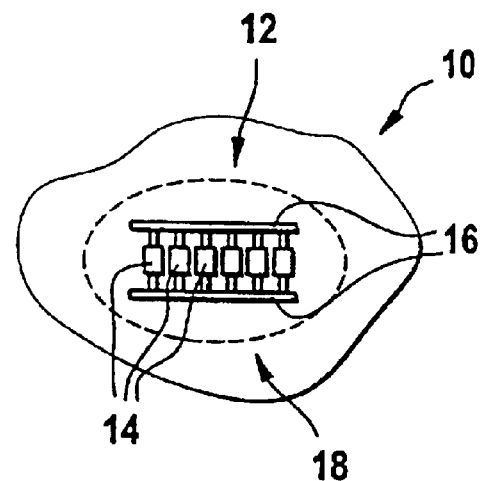
FIG. 1 shows a section of an airbag material with venting device.

In FIG. 1, a section of an airbag material 10 with a first embodiment of a venting device 12 is represented. The venting device 12 comprises several electrically ignitable pyrotechnic charges 14 which are interconnected in parallel by common connection lines 16. The individual pyrotechnic charges with a (non-depicted) control module, preferably the airbag control module, which supplies an ignition current to the connection lines 16 for triggering the device, are connected via the connection lines 16.

The pyrotechnic charges 14 are applied onto the airbag such that, when the charges are ignited, at least one thread of the textile airbag material is destroyed. Thereby, the woven or knitted fabric of the textile material is destroyed such that it cracks further open under the influence of a gas pressure prevailing in the airbag and uncovers an opening. The cracking open of the textile material is effected in the direction of the extension of the destroyed thread, so that by suitable weaving or knitting techniques a certain shape of the vent opening can be caused.

In order to restrict the vent opening in its dimension, i.e. in order to limit the cracking open of the airbag material to a certain length, the region where the pyrotechnic charges 14 are applied onto the airbag material 10 is preferably circumscribed by a reinforcing seam 18. At this seam 18, the crack forming in the airbag material is stopped in its further extension and thus the size of the vent opening is limited. In order to further increase the security against an uncontrolled cracking open, the surrounding seam 18 can also serve as a fastening seam for another reinforcing element.

If the direction of the spreading of the formed crack in the airbag material 10 is clearly defined, the critical region does in principle not have to be completely sewn up. In this case, it suffices indeed to provide two reinforcing seams which extend at the desired distance to one another transversely to the direction of the spreading of the crack. In practice, however, a complete sewing up of the critical region will be preferred for safety reasons.

Figure 2:
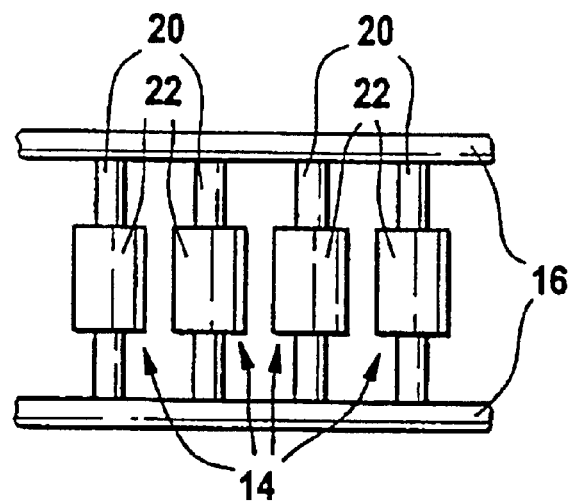
FIG. 2 shows in an enlarged section of FIG. 1 the parallel connection of the various pyrotechnic charges.
Figure 3:
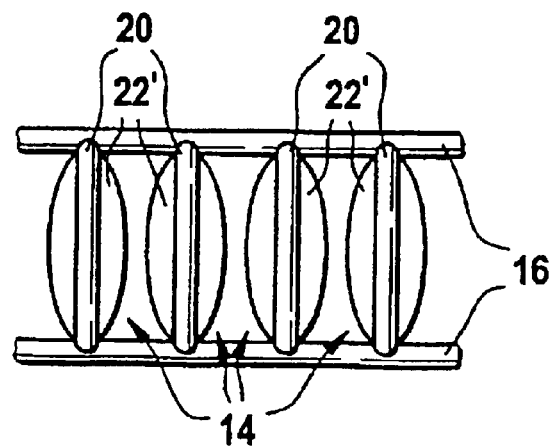
FIG. 3 shows an alternative embodiment of the parallel connection.

FIGS. 2 and 3 show, in an enlarged section of FIG. 1, various embodiments of the parallel connection of the various pyrotechnic charges 14. Each pyrotechnic charge 14 comprises in the represented embodiment a filament 20 which is interconnected between the two connection lines 16 and contacts the same. The filament can be introduced into the airbag material 10 or applied onto, the material 10, as represented. Subsequently, an explosive coating 22/22' is applied over the filament 20 onto the airbag material 10 and the filament 20. The explosive coating 22/22' can here comprise a lateral dimension being larger than the corresponding dimension of the filament 20. Thereby, the thread of the airbag material to be destroyed is destroyed over a greater length when the device is ignited. In the direction of the extension of the filament 20, too, the extension of the crack in the airbag hull can be influenced by appropriately dimensioning the explosive coating 22/22'. By an enlarged dimension of the explosive coating in this direction (cf. FIG. 3), the width of the region to be blasted can be directly influenced.

Figure 4:
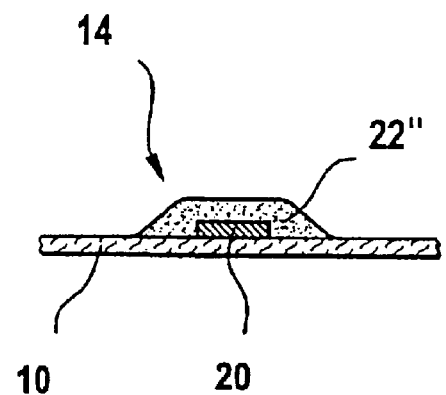
FIG. 4 shows a section through the airbag material with the pyrotechnic charge applied thereon.
Figure 5:
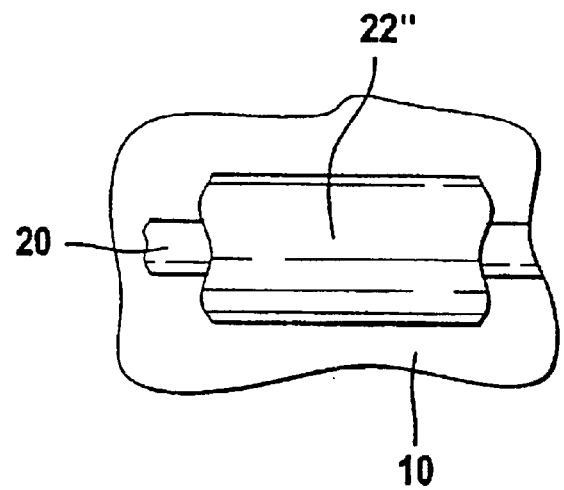
FIG. 5 shows a partial sectional view of the airbag material with the pyrotechnic charge applied thereon.

FIGS. 4 and 5 show a possible arrangement of the various elements of the pyrotechnic charge 14 on the airbag material. The filament 20 can, for example, be printed of conductive silver directly onto the airbag. Then, in an additive process, the explosive material 22" is applied onto this filament 20 in its desired dimension.

Figure 6:
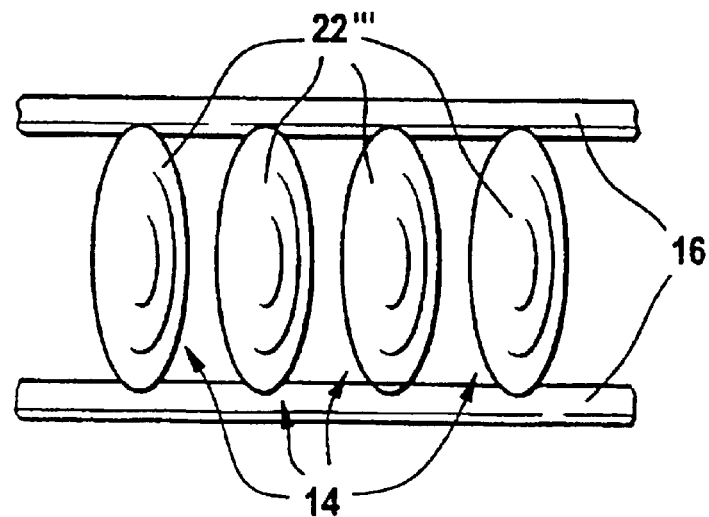
FIG. 6 shows an alternative embodiment of the pyrotechnic charges using an electrically conductive explosive.

An alternative embodiment of the pyrotechnic charges 14 using an electrically conductive explosive is shown in FIG. 6. In this embodiment, the pyrotechnic charge 14 comprises an explosive coating 22''' made of an electrically conductive explosive which is applied between the two connection lines 16 for the pyrotechnic charge 14, such that the explosive coating 22''', electrically contacts the two connection lines 16. When this pyrotechnic charge 14 is provided with the ignition current, the necessary heat for heating the explosive is generated in the explosive coating itself.

Figure 7:
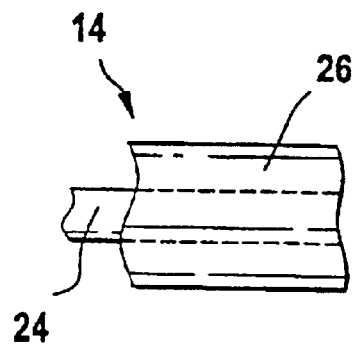
FIG. 7 shows another embodiment of a pyrotechnic charge.
Figure 8:
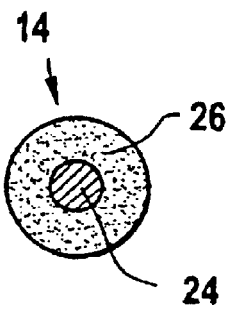
FIG. 8 shows a section through the embodiment of FIG. 7.

A completely different embodiment of the pyrotechnic charge is shown in FIGS. 7 and 8. In this variant, the pyrotechnic charge 14 is formed as an explosive thread which is introduced into the textile material of the gas bag or applied onto the textile material. Such an explosive thread comprises for example an electrically conductive stranded wire 24 which is surrounded by an explosive casing 26.

Alternatively, the explosive thread can comprise a stranded wire in the interweaving of which is introduced an explosive or a thread made of electrically conductive explosive material.

Figure 9:
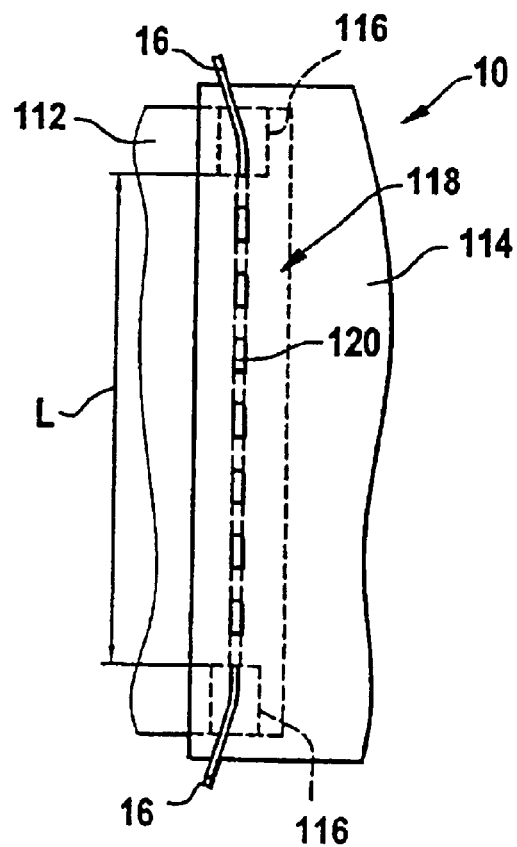
FIG. 9 shows a diagram for arranging the venting device on the airbag.

The explosive thread can, for example, be directly interlaced or worked into the textile material when the airbag material is manufactured. In this manner, the explosive thread becomes an integral part of the textile material. Another possibility of introducing the thread is to sew the explosive thread into the textile material after the production of the same. The explosive thread can, for example, serve as a seam thread with which a defined vent opening is sewn up. Such an introduction of the explosive thread is shown in FIG. 9. FIG. 9 accordingly shows a section of an airbag 10 in the region where two sections 112 and 114 of the airbag are sewn together. The two sections 112 and 114 overlap in the shown region and are usually sewn to one another by a simple or multiple-row seam 116.

For generating an appropriate vent opening 118, the normal seam 116 is interrupted over a certain length L in the present embodiment. The length L of the interruption of the seam 116 here corresponds to the desired length of the vent opening.

In order to seal the airbag, the two sections 112 and 114 of the airbag are subsequently sewn to one another in the region of the interruption of the normal seam 116 by means of one of the above described explosive threads 120. When conducting an appropriate electric current through the explosive thread 120, the same is heated up to a temperature above the ignition temperature of the explosive, so that the explosive is ignited and the seam 116 is destroyed.

Figure 10:
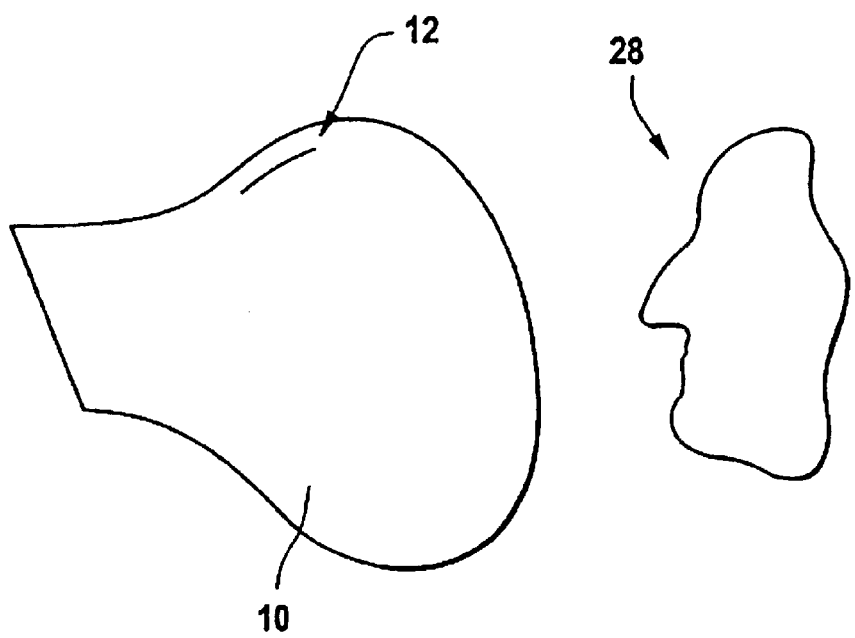

In FIG. 10, the arrangement of the vent opening 12 on the airbag 10 is schematically shown. The vent opening 12 is, as shown, preferably arranged in a region of the gas bag facing away from the passenger 28, such that the gas escaping from the formed vent opening does not blow against the passenger 28. In this manner, an injury of the passenger by the particles blown out together with the gas flow can be avoided.

LIST OF REFERENCE NUMERALS

10 Airbag made of airbag material
12 Venting device
14 Pyrotechnic charges
16 Connection lines
18 Reinforcing seam
20 Filament
22 Explosive coating
24 Electrically conductive stranded wire
26 Explosive casing
28 Passenger
112, 114 Sections of the airbag
116 Multiple-row seam
118 Vent opening
120 Explosive thread

What is claimed is:
1. A device for venting a gas bag made of a textile material, comprising at least one ignitable pyrotechnic charge which is associated to the gas bag in such a way that, when the pyrotechnic charge is ignited, at least one thread of the textile material is directly destroyed by the explosion of the pyrotechnic charge wherein said ignitable pyrotechnic charge is arranged in the textile material of said gas bag.

2. A device for venting a gas bag made of a textile material, comprising at least one ignitable pyrotechnic charge which is associated to the gas bag in such a way that, when the pyrotechnic charge is ignited, at least one thread of the textile material is directly destroyed by the explosion of the pyrotechnic charge wherein the pyrotechnic charge is formed as an explosive thread, said explosive thread being introduced into the textile material of the gas bag or being applied onto the textile material of the gas bag.

3. The device according to claim 2, wherein said explosive thread comprises an electrically conductive stranded wire, which is surrounded by an explosive covering.

4. The device according to claim 2, wherein said explosive thread comprises an electrically conductive stranded wire having an explosive material introduced into an interweaving of individual strands.

5. The device according to claim 2, wherein said explosive thread comprises a thread made of an electrically conductive explosive material.

6. A device for venting a gas bag made of a textile material, comprising at least one ignitable pyrotechnic charge which is associated to the gas bag in such a way that, when the pyrotechnic charge is ignited, at least one thread of the textile material is directly destroyed by the explosion of the pyrotechnic charge wherein said pyrotechnic charge comprises a filament and an explosive coating, the filament being introduced into the gas bag or applied onto the gas bag and the explosive coating being applied onto the gas bag in the region of the filament.

7. A device for venting a gas bag made of a textile material, comprising at least one ignitable pyrotechnic charge which is associated to the gas bag in such a way that, when the pyrotechnic charge is ignited, at least one thread of the textile material is directly destroyed by the explosion of the pyrotechnic charge wherein said pyrotechnic charge comprises an explosive coating made of an electrically conductive explosive and two connection lines, said coating being applied between said two connection lines onto the gas bag such that the explosive coating electrically contacts the two connection lines.

8. A device for venting a gas bag made of a textile material, comprising at least one ignitable pyrotechnic charge which is associated to the gas bag in such a way that, when the pyrotechnic charge is ignited, at least one thread of the textile material is directly destroyed by the explosion of the pyrotechnic charge wherein the pyrotechnic charge is associated to the gas bag at an inner side of the gas bag.

9. A device for venting a gas bag made of a textile material, comprising at least one ignitable pyrotechnic charge which is associated to the gas bag in such a way that, when the pyrotechnic charge is ignited, at least one thread of the textile material is directly destroyed by the explosion of the pyrotechnic charge wherein several ignitable pyrotechnic charges are arranged in a parallel connection with common connection lines.

10. A device for venting a gas bag made of a textile material, comprising at least one ignitable pyrotechnic charge which is associated to the gas bag in such a way that, when the pyrotechnic charge is ignited, at least one thread of the textile material is directly destroyed by the explosion of the pyrotechnic charge wherein connection lines for the ignitable pyrotechnic charge are applied onto the textile material of said gas bag introduced into the textile material of said gas bag.

11. A device for venting a gas bag made of a textile material, comprising at least one ignitable pyrotechnic charge which is associated to the gas bag in such a way that, when the pyrotechnic charge is ignited, at least one thread of the textile material is directly destroyed by the explosion of the pyrotechnic charge wherein a region of the gas bag, in which the pyrotechnic charge is associated to the gas bag, is circumscribed by at least one seam.

12. A passenger restraint system for a vehicle, comprising at least one airbag made of a textile material, said airbag having at least one pyrotechnic charge associated therewith in such a way that, when the pyrotechnic charge is ignited, at least one thread of the textile material is directly destroyed by the explosion of the pyrotechnic charge inflator means for inflating said airbag a control device for controlling the deployment of said airbag, and sensor means for detecting a pressure exerted by the airbag on the passenger, wherein said control device triggers the ignition of said pyrotechnic charge based on a pressure signal detected by the sensor means when a predetermined threshold value is exceeded.

13. The passenger restraint system according to claim 12, wherein the control device evaluates the pressure signal of the sensor means according to the pressure and/or time.

14. The passenger restraint system according to claim 12, wherein the pyrotechnic charge is arranged on the airbag in a region which faces away from the passenger when the airbag is deployed.

15. The passenger restraint system according to one of claim 12, wherein the pyrotechnic charge is designed such that the total area of ventilation openings in the airbag conditioned by the ignition of the pyrotechnic charge is larger than a total area of outlet openings of the airbag, which permit an escape of the gas after the complete defolding of the airbag.

16. The passenger restraint system according to claim 12, wherein several pyrotechnic charges are associated to the airbag in different regions thereof.

17. The passenger restraint system according to claim 16, wherein the sensor means further detects the position of an impact region on the airbag, where the airbag exerts a local pressure on the passenger, and wherein, based on a position signal detected by the sensor means, the control device triggers the ignition of a pyrotechnic charge, which is essentially opposite the impact region with respect to the airbag.

18. The passenger restraint system according to claim 12, wherein the sensor means comprises at least one sensor, which is arranged on the airbag in a region which faces the passenger when the airbag is released.

19. The passenger restraint system according to claim 18, wherein the sensor is a force sensor arranged on the airbag.

20. The passenger restraint system according to claim 19, wherein said force sensor comprises at least two electrode structures, which are applied onto a textile substrate at a predefined distance, and a layer of a semiconductor material which is applied over the electrode structures in an active region of the sensor in direct contact with the electrode structures, the layer made of a semiconductor material comprising an inner resistance being variable in response to a deformation of the layer.

21. The passenger restraint system according to claim 20, wherein the textile substrate comprises the airbag material, the electrode structures being directly applied onto the airbag.

* * * * *